June 3, 1958 F. W. BROWN 2,837,700
IMPULSE RESPONSIVE CIRCUIT
Filed Nov. 28, 1955
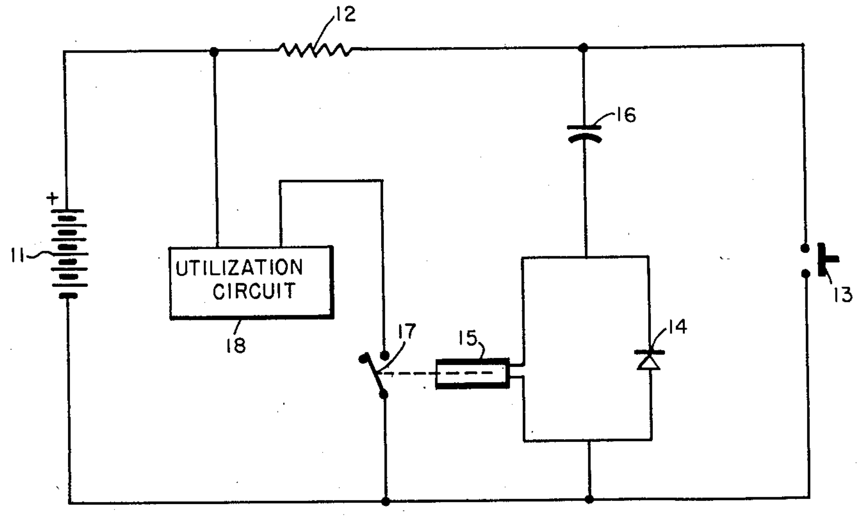
INVENTOR.
FORREST W. BROWN
BY Ervin B. Steinberg
AGENT

United States Patent Office 2,837,700

Patented June 3, 1958

2,837,700

IMPULSE RESPONSIVE CIRCUIT

Forrest W. Brown, New Canaan, Conn., assignor to The Reflectone Corporation, Stamford, Conn., a corporation of Connecticut Application November 28, 1955, Serial No. 549,407

6 Claims. (Cl. 317—141)

This invention relates to an impulse responsive circuit and has particular application to a circuit wherein a second circuit is actuated in response to a momentary change of conditions in a first circuit.

The problem of actuating a second circuit in response to a transient in a first circuit is one which presents well known difficulties. The momentary change of conditions in the first circuit usually is not long enough to permit the direct actuation of the second circuit which hereinafter is called "utilization circuit." In view of this most electrical circuits well known in the art employ thyratron tubes or gas filled tubes which when triggered by a short impulse act in the manner of latching relays. Other circuits well known employ "time stretching" means such as electronic time delay circuits. Both of these methods are rather cumbersome and require a number of additional and extra circuit components to effect the actuation of the utilization circuit.

One of the objects of this invention is therefore to provide a new and improved pulse responsive circuit which avoids one or more of the disadvantages of prior art devices.

Another object of this invention is the provision of an impulse responsive circuit characterized by utmost simplicity and reliability.

A still further object of this invention is the provision of a circuit which avoids the use of electronic amplifying means and eliminates the need for electronic vacuum tubes.

A still further object of this invention is the provision of an impulse responsive circuit which in view of the absence of thermionic tubes requires a negligible amount of standby power.

For a better understanding of the present invention together with other and further objects thereof reference is made to the following description taken in connection with the accompanying drawing in which the figure is a schematic circuit diagram of the impulse responsive circuit and of the utilization circuit.

Referring now to numeral 11, a source of direct current is identified which via a resistor 12 is connected to an electrical circuit network. This network includes the parallel connection of a rectifier 14 and of a current responsive device, such as relay 15, and both being connected serially to capacitor 16. This circuit network can be bypassed momentarily by a switching means, such as push button 13. Actuation of relay coil 15 causes contact 17 to close the circuit to a utilization circuit 18 which is shown as becoming energized from source 11. This utilization circuit may comprise an alarm, a counting device, or any other suitable electrically energized circuit operated in response to changing conditions initiated by operating device 13.

The operation of this circuit may be visualized as follows:

When the switching device 13 is in its normal condition, i. e., the circuit across the switch contacts is open, source 11 via resistor 12 and magnetic coil 15 maintains capacitor 16 charged at the supply voltage level.

Upon closing momentarily push button 13, a low impedance circuit is established across the combination of rectifier 14 and capacitor 16, thus causing the capacitor 16 to discharge. Since the entire circuit is to operate upon a short impulse or a transient, it is important that rectifier 14 have a very low forward resistance. It has been found that this can be achieved very satisfactorily for instance by the use of a germanium diffused junction diode 1N92, commercially available from the General Electric Company, Schenectady, N. Y. This rectifier is characterized by an extremely low forward resistance (in the order of a few ohms) and by the ability of permitting the passage of a high peak forward current.

After the switching device 13 is restored to its initial condition, that is, the bypass temporarily established is removed, capacitor 16 will slowly charge up to full voltage via the circuit comprising resistor 12, capacitor 16 and relay coil 15. As it is well known, for a constant capacity the charging rate and time is governed by the resistance 12 and by the resistance of the relay coil 15. If relay coil 15 is of the type usually employed in the anode circuits of vacuum tubes, the resistance will be in the order of several thousand ohms. While the capacitor is being charged, current flows through relay coil 15 to cause actuation of contact 17 which in turn causes energizing of utilization circuit 18. The relay automatically disconnects the utilization circuit 18 as soon as the current through the relay coil decreases to the drop-out value and shortly thereafter capacitor 16 is fully charged so that the entire circuit is reset.

From the foregoing it will be apparent that utilization circuit 18 is not actuated while capacitor 16 is being discharged, which occurs in an extremely short time, but during the time in which the charge is restored to the capacitor which occurs in a considerably longer period of time.

The operation of the instant circuit is dependent primarily upon the short time discharge of capacitor 16 and the ability of rectifying device 14 to pass current of high peak values with a minimum amount of forward resistance. It has been found that this can be accomplished by the use of the typical rectifying element stated above.

It will be apparent that this circuit is characterized not only by extreme simplicity but also by the absence of electronic tubes usually employed. No standby power of any type is required while the circuit awaits the change in conditions. The instant circuit is therefore particularly useful in portable set-ups where battery operation is necessary. Traffic counting devices for instance may serve as a typical illustration.

While there has been described a certain preferred embodiment of the invention it will be obvious to those skilled in the art that various changes and modifications may be made therein without departing from the field of the invention which should be limited only by the scope of the appended claims.

What is claimed is:

1. An impulsive responsive circuit comprising; a source of direct current voltage connected to an electrical circuit network which includes the parallel connection of a current responsive device and a rectifying device, and a capacitor serially connected to said parallel connection thereby causing said capacitor normally to be maintained charged from said source; electrical switching means adapted to momentarily establish a short circuit across said network connected in parallel with said electrical network; an utilization circuit operated in response to actuation of said current responsive device; and said rectifier being connected in such a manner and having a sufficiently low forward resistance to cause substantial discharging of said capacitor during the momentary short circuit condition.

2. An impulse responsive circuit comprising; a source of direct current voltage connected to an electrical circuit network which includes the parallel connection of the winding of an electromagnetic relay and a rectifying device, and a capacitor serially connected to said parallel connection thereby causing said capacitor normally to be maintained charged from said source; electrical switching means adapted to momentarily establish a short circuit across said network connected in parallel with said electrical network; an utilization circuit operated in response to current flow through said relay winding when said capacitor is charging; and said rectifier being connected in such a manner and having a sufficiently low forward resistance to cause substantial discharging of said capacitor during the momentary low impedance short circuit condition.

3. An impulse responsive circuit as set forth in claim 2 wherein said rectifier is a diffused junction rectifier.

4. An impulse responsive circuit comprising; a source of direct current voltage connected serially with a current limiting device to an electrical circuit network which includes the parallel connection of the winding of an electromagnetic relay and a rectifying device, and a capacitor serially connected to said parallel connection thereby causing said capacitor normally to be maintained charged; electrical switching means adapted to momentarily establish a short circuit across said network connected in parallel with said electrical network; an utilization circuit operated in response to current flow through said relay winding when said capacitor is charging; and said rectifier being connected in such a manner and having a sufficiently low forward resistance to permit substantial discharging of said capacitor during the momentary short circuit condition.

5. An impulse responsive circuit as set forth in claim 4 wherein the utilization circuit receives its energy from said source.

6. An impulse responsive circuit as set forth in claim 4 wherein said rectifier is a metallic diode.

References Cited in the file of this patent

UNITED STATES PATENTS

| | | |
|---|---|---|
| 2,421,148 | Hadfield | May 27, 1947 |
| 2,590,302 | Evans | Mar. 25, 1952 |
| 2,635,197 | Routledge | Apr. 14, 1953 |

FOREIGN PATENTS

| | | |
|---|---|---|
| 481,054 | Great Britain | Mar. 4, 1938 |